(12) United States Patent
Watte et al.

(10) Patent No.: US 7,537,398 B2
(45) Date of Patent: May 26, 2009

(54) OPTICAL FIBRE SPLICE CONNECTOR

(75) Inventors: Jan Watte, Grimbergen (BE); Lodewijk van Noten, Leuven (BE); Jacob Arie Elenbaas, RP Heyningen (NL); Thomas De Boer, JP Nijmegen (NL); Willy Rietveld, DK Benschop (NL)

(73) Assignee: Tyco Electronics Raychem NV, Dessel-Lo (BE)

( * ) Notice: Subject to any disclaimer, the term of this patent is extended or adjusted under 35 U.S.C. 154(b) by 52 days.

(21) Appl. No.: 10/578,152

(22) PCT Filed: Oct. 27, 2004

(86) PCT No.: PCT/GB2004/004519

§ 371 (c)(1),
(2), (4) Date: May 4, 2006

(87) PCT Pub. No.: WO2005/052665

PCT Pub. Date: Jun. 9, 2005

(65) Prior Publication Data

US 2007/0047883 A1    Mar. 1, 2007

(30) Foreign Application Priority Data

Nov. 4, 2003   (GB) ................................. 0325697.1

(51) Int. Cl.
*G02B 6/255* (2006.01)
(52) U.S. Cl. .............................. 385/98; 385/70; 385/99
(58) Field of Classification Search ............. 385/95–99, 385/65, 83, 70
See application file for complete search history.

(56) References Cited

U.S. PATENT DOCUMENTS

| 4,946,249 | A |   | 8/1990  | Barlow et al.         |
|-----------|---|---|---------|-----------------------|
| 5,102,212 | A |   | 4/1992  | Patterson             |
| 5,404,417 | A |   | 4/1995  | Johnson et al.        |
| 5,857,045 | A | * | 1/1999  | Lee ............... 385/70 |
| 5,963,699 | A |   | 10/1999 | Tanaka et al.         |
| 5,984,532 | A | * | 11/1999 | Tamaki et al. ...... 385/70 |

(Continued)

FOREIGN PATENT DOCUMENTS

EP      0 116 481 B1   4/1987

(Continued)

*Primary Examiner*—Hemang Sanghavi
(74) *Attorney, Agent, or Firm*—Baker & Daniels LLP

(57) ABSTRACT

An optical fiber connector (1) for forming a mechanical splice between first and second bare optical fibers (9) stripped of coatings, the connector comprising a connector body that is divided into at least two parts (3, 5) along at least part of a length thereof arranged such that the optical fibers may be clamped between the parts, and the connector body comprises at least two independently openable main clamping sections (23) dimensioned to clamp directly onto the bare fiber of the first and second optical fibers, and the connector body includes at least one additional clamping section (25) dimensioned to clamp onto a coated portion of one of the optical fibers, and the clamping sections are arranged such that the first optical fiber may be clamped by a first of the main clamping sections independently of the second optical fiber, enabling the clamping of the first fiber against rotational and axial movement with respect to the connector body to remain substantially undisturbed by subsequent clamping or unclamping of the second fiber.

22 Claims, 9 Drawing Sheets

U.S. PATENT DOCUMENTS 7,258,496 B2 * 8/2007 Saito et al. .................... 385/98

FOREIGN PATENT DOCUMENTS

| | | |
|---|---|---|
| EP | 0 226 482 A1 | 6/1987 |
| JP | 57073711 A * | 5/1982 |
| JP | 09-304643 | 11/1997 |
| WO | WO 86/01306 A1 | 2/1986 |
| WO | WO 93/05418 A1 | 3/1993 |
| WO | WO 93/24851 A1 | 12/1993 |

* cited by examiner

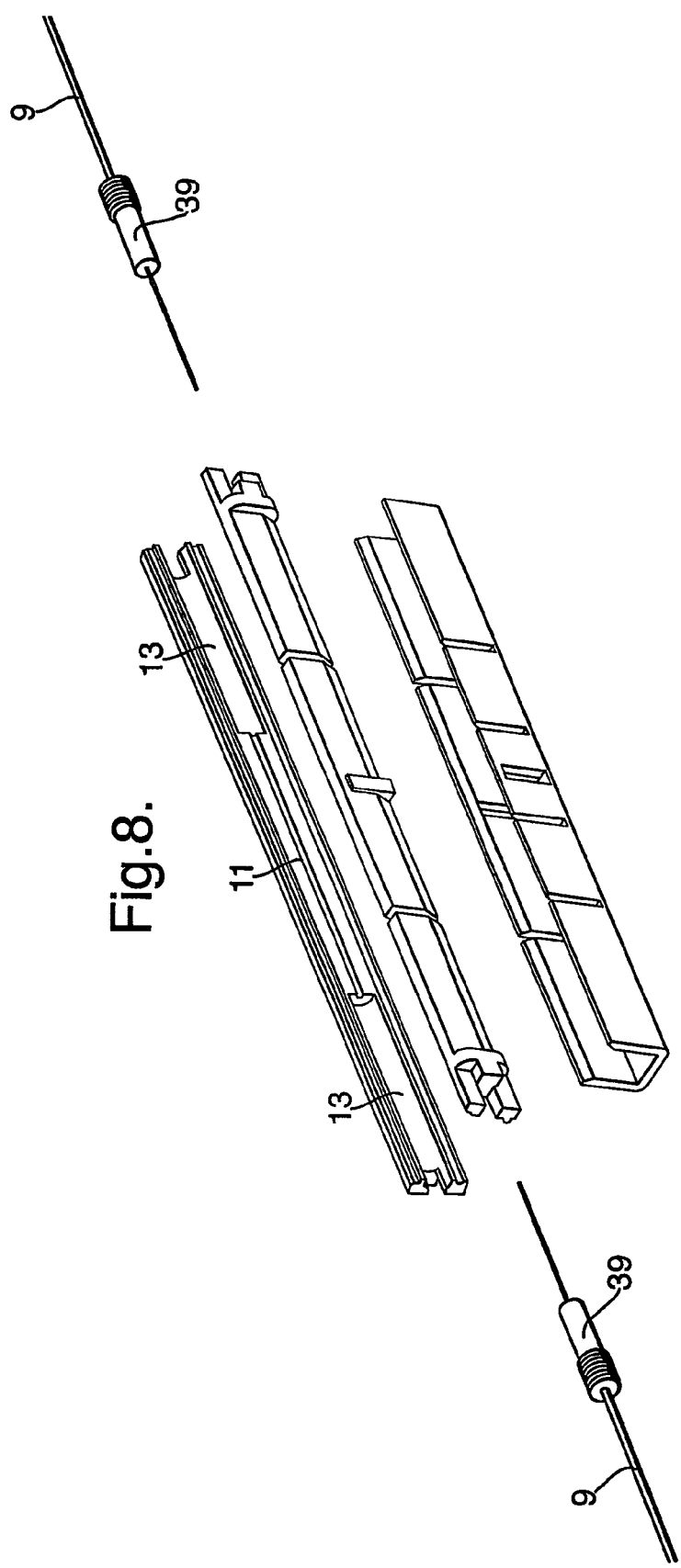

OPTICAL FIBRE SPLICE CONNECTOR

The present invention relates to optical fibre connectors for forming mechanical splices between optical fibres.

There are a wide variety of designs of optical fibre connector for forming mechanical splices (i.e. splices in which the fibres are spliced together by mechanical means). An example of one type of mechanical splice connector is disclosed in U.S. Pat. No. 4,946,249. The connectors disclosed in that document each comprise a pair of housing halves which, when assembled together provide a housing having a channel extending therethrough to accommodate the fibres being spliced. The fibres generally have coatings which need to be stripped away from the end sections of the fibres that are butted together to form the splice. The channel in the connector housing is wider at the ends of the housing to accommodate the coated sections of the fibres, and narrower in the middle of the housing to accommodate the bare stripped fibres. Because there is more than one typical thickness of an optical fibre coating, some of the connector housings have differing channel diameters at opposite ends of the housing, so that dissimilar sizes of fibre can be spliced together. There is also a respective connector housing for splicing together each size of optical fibre. Consequently a range of different connector housings is required.

U.S. Pat. No. 5,963,699 discloses optical fibre mechanical splice connectors comprising a base and a lid between which spliced optical fibres are clamped, by means of an external spring clamp that holds the base and the lid together. The lid is formed from three separate sections, i.e. a single middle section for clamping both stripped bare portions of the spliced fibres, and two end sections for clamping each of the two coated fibre portions. The spring clamp is divided into three section corresponding to the three sections of the lid, so that the clamping force can be adjusted for each lid section independently of the other sections.

The present invention provides optical fibre connectors that have major advantages over the known connector systems described above, including:

(i) "half-installability", i.e. the ability to install a first optical fibre (or a first set of optical fibres) in a mechanical splice connector, and to install a second optical fibre (or a second set of fibres) to be spliced with the first fibre(s) at a later time;

(ii) the ability to close a "half-installed" mechanical splice connector such that the interior of the connector and the installed optical fibre(s) are protected, until the second optical fibre(s) is/are spliced;

(iii) the ability to clamp the first optical fibre(s) against movement in the x, y, or z directions, and also against rotation, even while the second optical fibre(s) is/are spliced to the first fibre(s)—which enables the orientation of an angled cleaved end face of the (or each) first fibre to be fixed for subsequent splicing with a second fibre;

(iv) the ability of a single mechanical splice connector to accommodate different diameters of optical fibre, for example both 250 μm diameter coated fibre and 900 μm diameter coated fibre; and (v) the versatility of a mechanical splice connector either not to include a means of precisely aligning the spliced optical fibres (where the numerical aperture of the fibres is such that no precise alignment is required), or to include any one of a variety of alignment means, to suit particular requirements.

Other advantages of the present invention will be apparent from the rest of this specification.

Accordingly, a first aspect of the present invention provides an optical fibre connector (1) for forming a mechanical splice between first and second bare optical fibres (9) stripped of coatings, the connector comprising a connector body that is divided into at least two parts (3, 5) along at least part of a length thereof, arranged such that the optical fibres may be clamped between the parts and that comprises at least two main clamping sections (23) dimensioned to clamp directly onto the bare fibre of the first and second optical fibres, characterised in that the connector body includes at least one additional clamping section (25) dimensioned to clamp onto a coated portion of one of the optical fibres, and the clamping sections are arranged such that the first optical fibre may be clamped by a first of the main clamping sections independently of the second optical fibre, enabling the clamping of the first fibre against rotational and axial movement with respect to the connector body to remain substantially undisturbed by subsequent clamping or unclamping of the second fibre.

By "bare optical fibres stripped of coatings" is generally meant that end portions of the fibres to be spliced are stripped of coatings, or merely that the fibres (or at least their end portions) substantially lack coatings. The stripped coatings generally comprise primary coatings and/or buffer coatings.

As indicated above, the first aspect of the present invention provides a mechanical splice connector that enables a first optical fibre to be fixed in the connector, and a second optical fibre to be spliced with the first fibre at a subsequent time, without the first fibre being disturbed. This may be required, for example, so that the major parts of an optical fibre network may be deployed, and subscribers subsequently connected to the network as and when required. One example of why it may be important not to disturb the first fibre when the second fibre is spliced with it, is that the end face of the first fibre may have been cleaved at an angle with respect to the perpendicular (from its longitudinal axis) in order to prevent or at least minimize undesirable reflections back along the fibre from the end face (which may disrupt the transmission of data in the network). A great advantage of the present invention is that it can facilitate the mechanical splicing of a first fibre with a second fibre by maintaining the rotational orientation of an angled end face of the first fibre in the mechanical splice connector, and avoiding the need to disturb such orientation when the second fibre is introduced.

This first aspect of the invention enables the clamping of the first fibre to remain substantially undisturbed by subsequent clamping or unclamping of the second fibre because the main clamping sections (which are dimensioned to clamp directly onto both bare optical fibres) comprise at least two sections arranged such that the first fibre may be clamped by a first of the sections independently of the second fibre. The connectors disclosed in U.S. Pat. No. 5,963,699 do not have this advantage because the middle section of the lid of those connectors comprises only a single section dimensioned to clamp both of the bare fibres. Consequently, in order to clamp or unclamp a second fibre subsequently to the clamping of a first fibre, it would be necessary to unclamp the first fibre from the middle section of the lid of such a connector. Now, although the connectors disclosed in U.S. Pat. No. 5,963,699 also include separate end sections that independently clamp the coated portions of the fibres (and which are not dimensioned to clamp directly onto the bare fibre stripped of coatings), the problem of the unclamping of the first fibre is still not solved, because it is a fact that an optical fibre clamped only by its outer coating (and not clamped directly onto the central bare fibre itself) is generally able to rotate about its axis. Consequently, the connectors disclosed in U.S. Pat. No.

5,963,699 are not generally able to preserve the rotational orientation of a first installed fibre when a second fibre is added to, or removed from, the connector.

As indicated above, in addition to the two or more main clamping sections configured to clamp directly onto the bare fibre of the first and second stripped optical fibres, the connector body includes at least one, and preferably at least two, additional clamping sections dimensioned/configured and arranged to clamp onto coated portions of the optical fibres, i.e. portions of the fibres from which the coatings have not been stripped. The two or more main clamping sections arranged to clamp the bare fibres categorically are not equivalent to such additional clamping sections of the present invention or of the prior art.

In preferred embodiments of this invention, the connector body comprises at least four clamping sections configured to clamp the first and second optical fibres. At least two of these four clamping sections are the main clamping sections according to the invention and at least one, but preferably two, of the clamping sections are the preferred additional clamping sections.

In particularly preferred embodiments of the invention, the connector comprises at least five clamping sections.

The connector may include at least three main clamping sections configured to clamp directly onto bare optical fibre. A first of the main clamping sections may be arranged to clamp onto the first fibre only, a second of the main clamping sections may be arranged to clamp onto the second fibre only, and a third of the main clamping sections may be arranged to clamp onto both of the first and second fibres.

The assembled connector body of the connector according to all aspects of the invention preferably forms at least one channel arranged to accommodate the optical fibres. Preferably, the main clamping sections and the channel of the connector body are configured to clamp the bare fibre of the first and second optical fibres in the channel. The (or each) channel preferably has a first region, and a second region of greater diameter than the first region at each end of the first region. More preferably, the channel has a third region of greater diameter than the second region at the end of each second region remote from the first region. Preferably at least the second and third regions of the channel are substantially circular in cross-section.

In preferred embodiments of the invention, the connector may include alignment means for aligning the first and second optical fibres with each other. Preferably the optical fibres are sufficiently aligned by the alignment means to form a splice that minimizes optical losses such that any losses are of an acceptable level. A preferred alignment means is a channel of the connector body, preferably a channel as referred to in the preceding paragraph. The channel preferably is dimensioned such that the stripped bare portions of the first and second optical fibres form a tight fit within the channel. The channel may comprise a groove of the connector body, for example a V-groove or a U-groove, and/or it may comprise a substantially circular cross-section channel. Additionally, or alternatively, the alignment means may comprise an alignment member in which the first and second optical fibres may be received and aligned. The alignment member may include an alignment bore for receiving and aligning the optical fibres. The alignment member may, for example, comprise a tube (or the like), for example a capillary tube. The tube may be formed from glass, for example. Alternatively, the alignment member may comprise at least one plate, preferably a pair of plates, each of which has an aperture for receiving a respective one of the first and second fibres. One or both plates may include a lens (e.g. a micro-lens) to assist in coupling light between the fibres. The plates may be the same as, or similar to, the FIG. 13 embodiment of co-pending UK patent application number 0309908.2 filed on 30 Apr. 2003.

As indicated above in the summary of U.S. Pat. No. 4,946,249 optical fibres come in a range of diameters depending on the size of the coating applied to the bare fibre. For example, two standard sizes of optical fibre are 250 μm diameter and 900 μm diameter. 250 μm fibre is generally known as primary coated fibre (due to its relatively thin outer coating), and 900 μm fibre is generally known as buffer coated fibre (due to its relatively thick outer coating). The central fibre itself generally has a standard diameter irrespective of whether it is primary coated fibre or buffer coated fibre. A standard diameter for the bare fibre itself is 125 μm. Because optical fibres come in more than one size, it would be desirable to have a mechanical splice connector that could accommodate each size of fibre in one and the same device. This would avoid the need for a proliferation of different connectors for accommodating the different fibre sizes and the combinations of differently sized fibres to be spliced, as exemplified by U.S. Pat. No. 4,946,249. The present invention has the advantage of providing such a connector.

Preferably the first region of the channel of the connector is dimensioned to accommodate bare optical fibre stripped of its coatings (e.g. the bare fibre having a diameter of approximately 125 μm), and each second region preferably is dimensioned to accommodate primary coated optical fibre (e.g. the primary coated fibre having a diameter of approximately 250 μm). Preferably each third region is dimensioned to accommodate buffer coated optical fibre (e.g. the buffer coated fibre having a diameter of approximately 900 μm). Consequently, one and the same connector device may accommodate bare fibre, primary coated fibre, and/or buffer coated fibre. Preferably the second and third regions of the channel are dimensioned to accommodate coated optical fibres of different respective sizes. Consequently, by means of the second and third regions of the channel, the connector according to the invention fulfils the need for an optical fibre connector that can accommodate different sizes of optical fibre (due to the fibres having different thicknesses of coatings on the bare fibre) in one and the same connector device.

Preferably the connector further comprises a resilient clamp member arranged to retain the optical fibres in a clamped condition in the connector body. Advantageously, the resilient clamp member may be arranged to be retained on the exterior of the connector body. The clamp member may be arranged to retain the parts of the connector body together such that the optical fibres are clamped between the parts of the connector body.

In some embodiments of the invention, the connector may be arranged to clamp a plurality of ferrules or other fixing members, each of which is fixed (e.g. crimped) to a respective optical fibre such that the ferrule or other fixing member is secured in the connector body when the fibres are spliced. Such ferrules or other fixing members may assist in retaining a desired rotational orientation and/or axial position of its respective fibre in the connector.

The connector according to the invention may advantageously be arranged to form mechanical splices between a plurality of first and second optical fibres (e.g. multiple fibre splices). The connector body may therefore comprise a plurality of channels arranged to accommodate the plurality of first and second optical fibres.

Some preferred embodiments of the invention will now be described, by way of example, with reference to the accompanying drawings, of which:

FIG. 8 illustrates a second preferred embodiment of an optical fibre connector according to the invention.

Figure 1:
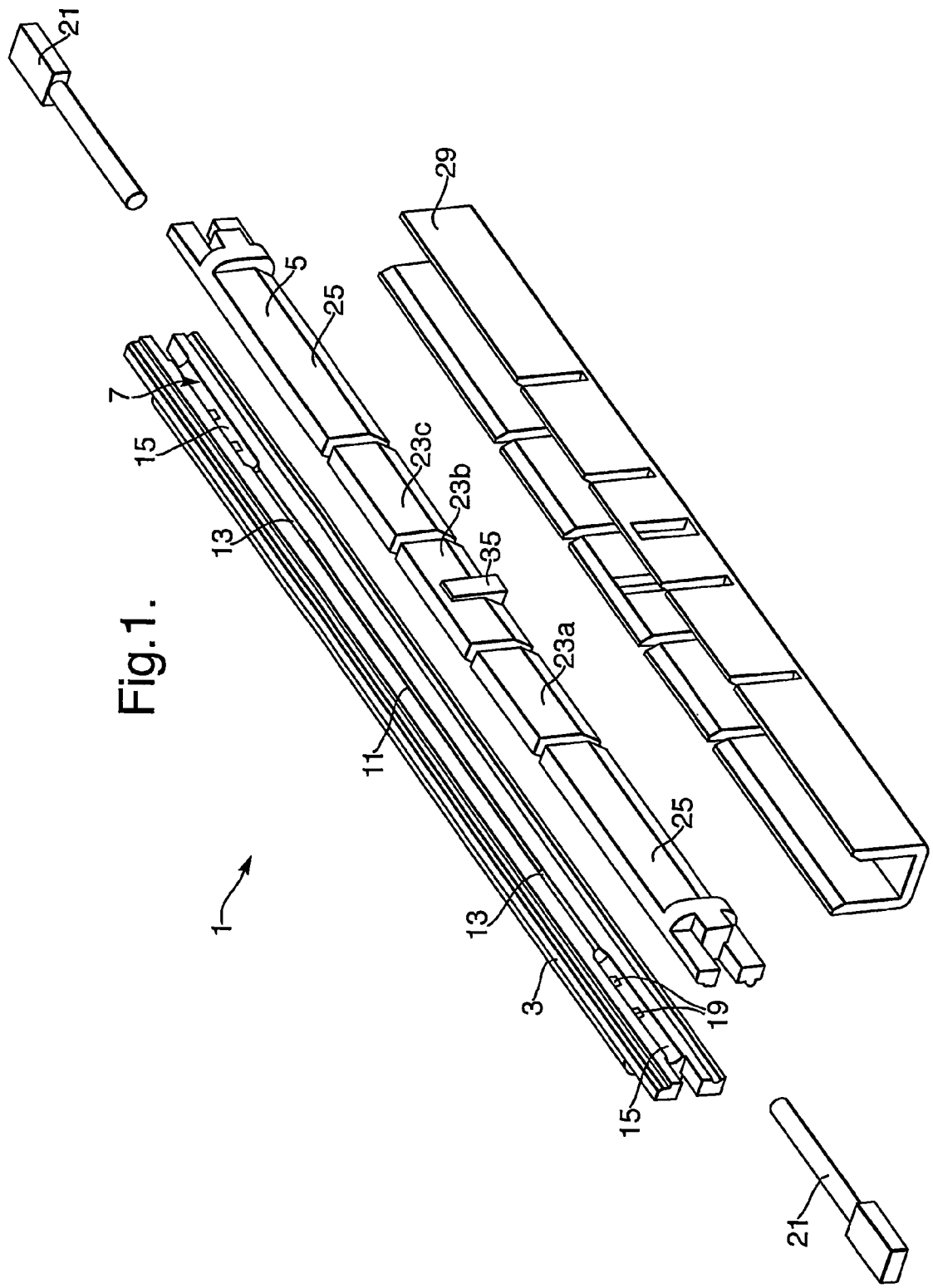
FIG. 1 illustrates the components of a preferred optical fibre connector according to the invention.
Figure 3:
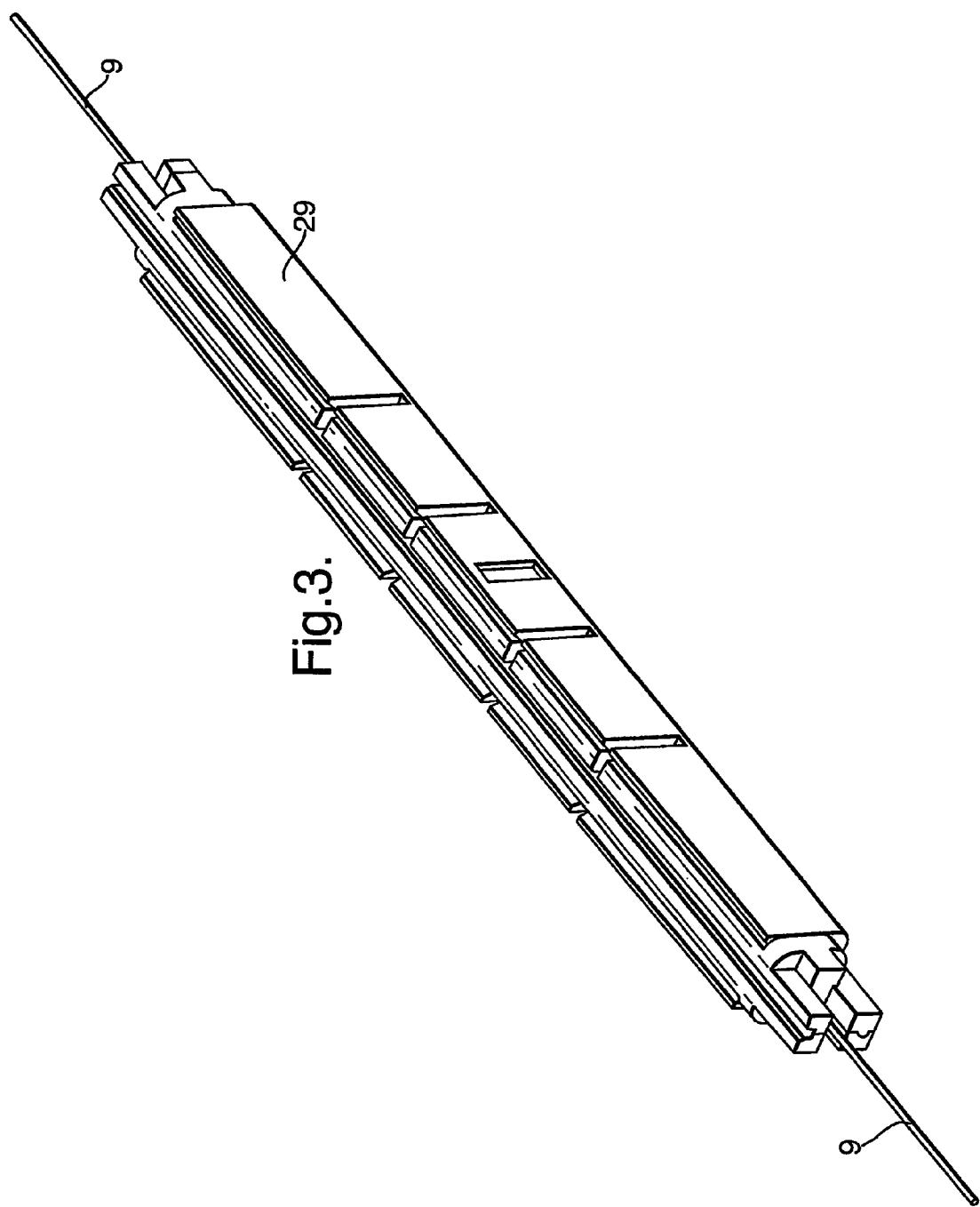
FIG. 3 illustrates the connector of FIGS. 1 and 2 in an assembled state with optical fibres installed and spliced in the connector.

FIG. 1 illustrates the components of a preferred optical fibre connector according to the invention. The connector 1 comprises a connector body comprising two parts 3 and 5 which divide the connector body in two along the length of the connector body. The two parts 3 and 5 may be regarded as half-shells of the connector body. The first part 3 will be designated as a base part 3, and the second part 5 will be designated as a lid part 5. The base part 3 is shown in detail in FIG. 4, and the lid part 5 is shown in detail in FIG. 5. Each of the parts 3 and 5 includes a longitudinal groove 7 which, when the parts are brought together to close the connector body define a longitudinal channel extending through the connector body for accommodating optical fibres 9 (refer to FIGS. 3 and 8) spliced in the connector in use.

The groove 7 forming the channel comprises a longitudinally central first region 11, second regions 13 at each end of the first region 11, and third regions 15 at each end of the second region 13 (opposite to the ends adjacent to the first region 11). Each second region 13 has a greater diameter than the first region 11, and each third region 15 has a greater diameter than its adjacent second region 13. As described earlier in the specification, the first region 11 of the groove 7 is dimensioned so that the channel can accommodate bare optical fibre stripped of coatings in a tight clamping fit when the lid part 5 and the base part 3 of the connector body are clamped tightly together. The bare optical fibre preferably has an external diameter of approximately 125 μm.

Figure 4:
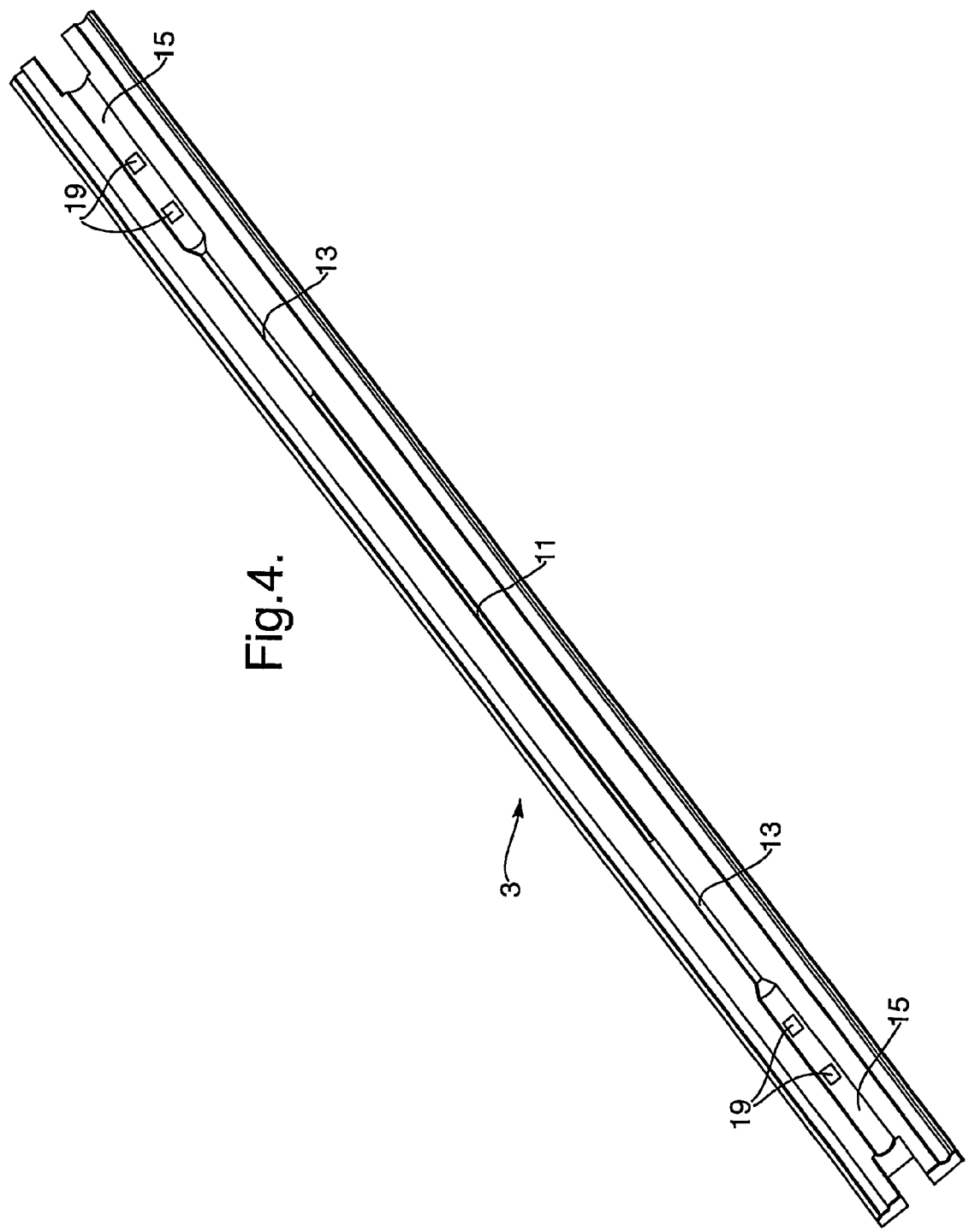
FIG. 4 illustrates a base part of the connector of FIGS. 1 to 3.
Figure 5:
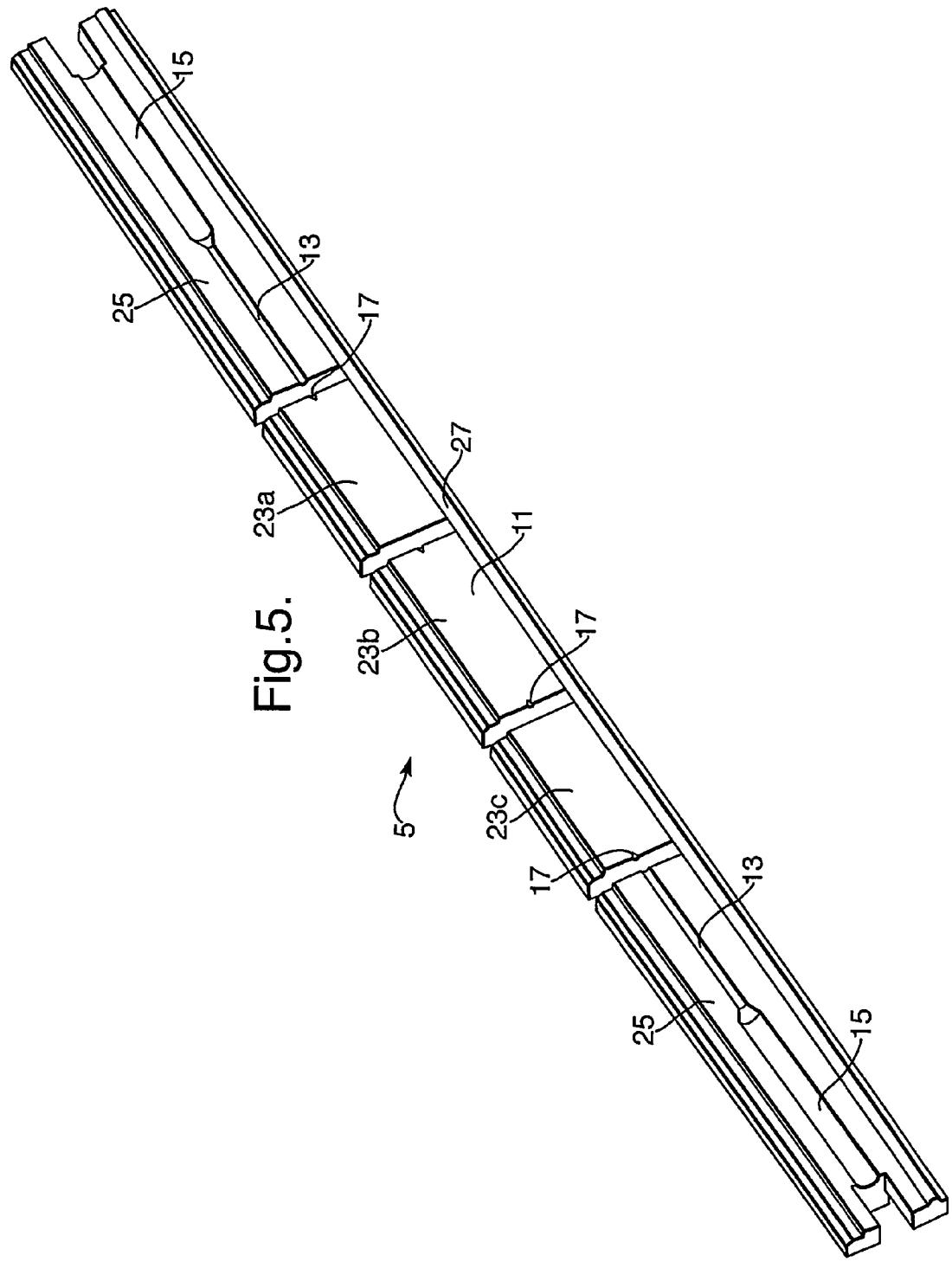
FIG. 5 illustrates a lid part of the connector of FIGS. 1 to 4.

As shown in FIG. 4, one of the parts of the connector body, preferably the base part 3, includes a semicircular cross-section groove as its portion of the first region 11 of the channel. The other part of the connector body, preferably the lid part 5 as shown in FIG. 5, preferably is substantially flat in its first region, other than small recesses 17 which help to guide and retain the fibres in position. The fact that the first region of the channel is not circular in cross-section but includes a flat section helps to clamp the bare fibre tightly in the first region. The second and third regions, however, preferably are substantially circular in cross-section, as shown in FIGS. 4 and 5.

One or both of the second and third regions may include one or more retaining members arranged to cut into the respective coating of the optical fibre to provide axial pull resistance, especially in order to counter creep which might otherwise occur over time. FIGS. 1 and 4 show retaining members 19 in the third regions 15 of the groove 7 of the base part 3.

Figure 2:
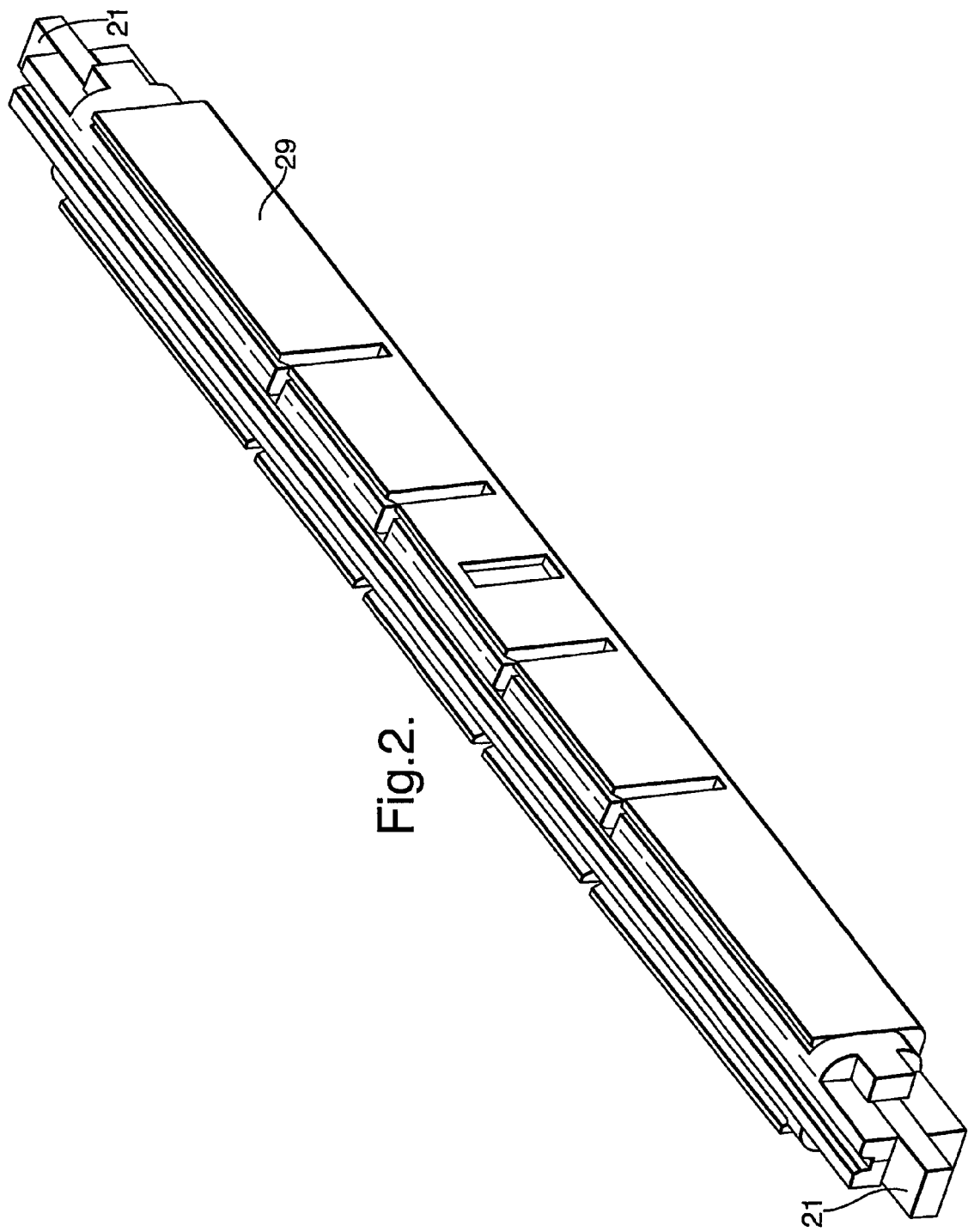
FIG. 2 illustrates the connector of FIG. 1 in an assembled state without optical fibres installed in the connector.

As shown in FIGS. 1 and 2, the connector may include plugs 21 arranged to close, and preferably to seal, the ends of the groove 7 prior to, and during, installation of the optical fibre splice. The plugs 21 preferably prevent dust or other dirt ingress into the connector, and preferably also water ingress into the connector, which could have a detrimental effect on the integrity of the splice. The plugs are removable from the channel to enable the optical fibres to be inserted.

As shown in FIGS. 1 and 5, at least one of the parts of the connector body, preferably the lid part 5, is divided into a plurality of sections 23 and 25. The sections 23 and 25 are clamping sections of the connector body. As illustrated, there are five clamping sections, comprising three main clamping sections 23 arranged to clamp directly onto the bare optical fibre in the first region 11 of the groove 7, and two additional clamping sections 25 arranged to clamp directly onto the coated portions of the optical fibres in the second or third regions of the groove 7.

FIG. 5 illustrates how the clamping sections 23 and 25 are divided from each other along the length of the connector body. There is a continuous strip 27 of the connector body extending generally along one edge of the lid part 5, and each clamping section extends from the strip 27. Other than by contract via the strip 27, each clamping section is separated from each adjacent clamping section by a gap, thereby enabling the clamping sections to move, and therefore clamp, independently of each other.

Figure 6:
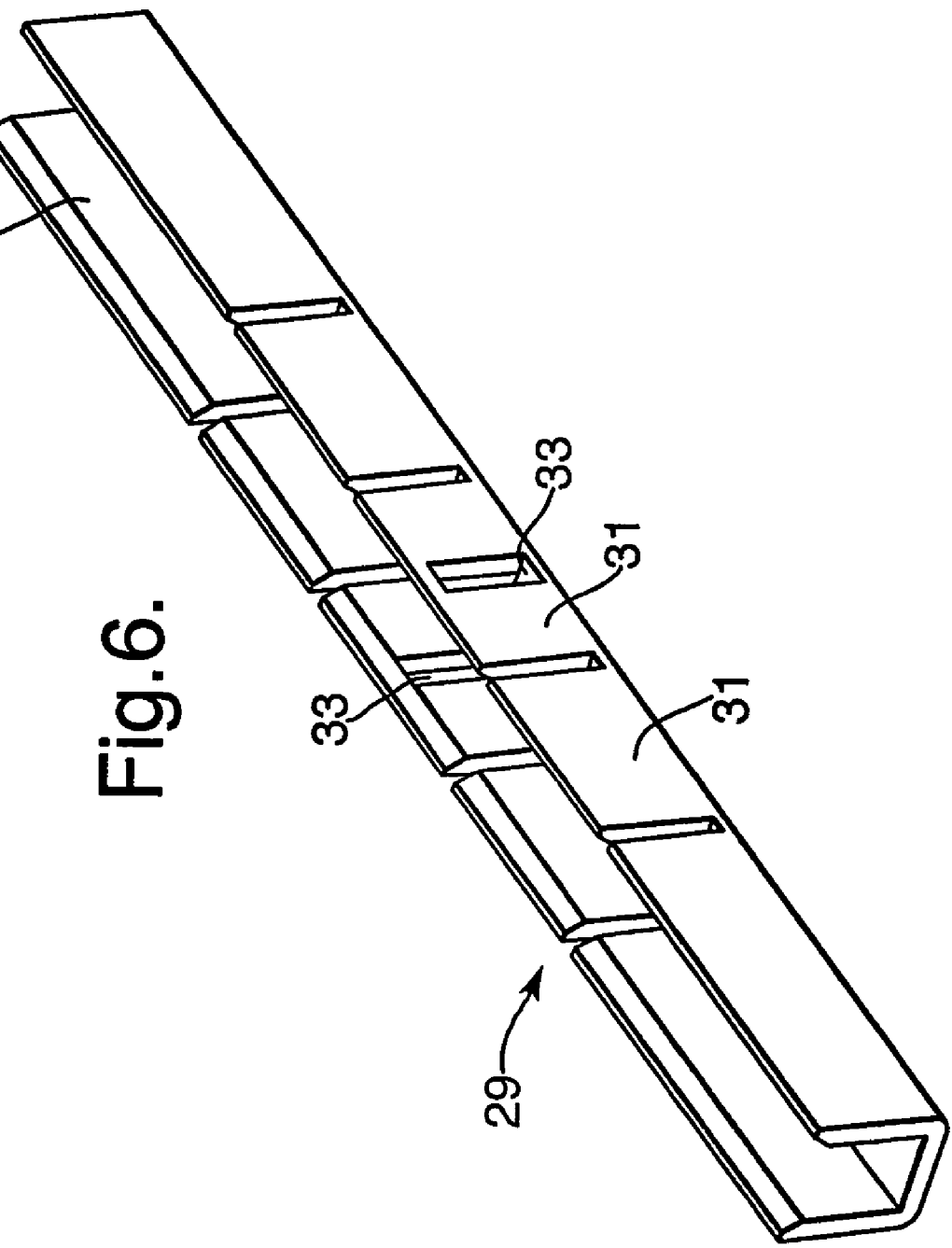
FIG. 6 illustrates a resilient clamp member of the connector of FIGS. 1 to 5.

As shown most clearly in FIGS. 1 and 6, the connector also includes a resilient clamp member 29 in the form of a generally U cross-section resilient metal member that is configured to be retained on the exterior of the connector body. The resilient clamp member 29 is arranged to retain the lid part 5 and the base part 3 together such that they are tightly clamped around the spliced optical fibres. The two generally parallel arms of the resilient clamp member are divided into clamping sections 31, which form part of the respective clamping sections 23 and 25 of the connector body. The clamping sections 31 of the resilient clamp member enable the clamping sections 23 and 25 of the connector to clamp the fibres independently of each other. A longitudinally central clamping section of the resilient clamp member 29 includes an aperture 33 arranged to receive a protrusion 35 on the connector body to retain the clamp member in place on the connector body.

Because the connector body and the resilient clamp member include three separate main clamping sections arranged to coincide with the first region 11 of the groove 7, the stripped bare portions of two optical fibres spliced in the connector may be clamped independently of each other. Specifically, a first main clamping section 23a clamps only a first bare optical fibre, a second main clamping section 23c clamps only a second bare optical fibre, and a third main clamping section 23b clamps both of the first and second bare optical fibres. Consequently, a tremendous advantage of the invention (as described earlier) is that a first optical fibre may be installed in the connector body in preparation for splicing with a second optical fibre to be installed in the connector body at a later time. The end face of the first optical fibre preferably is cleaved at a non-perpendicular angle with respect to the longitudinal axis of the fibre, in order to minimise bade reflections. As a way of facilitating the splicing of the fibre to a second fibre (also having a non-perpendicular end face) it is preferably to determine and to retain the orientation of the end face of the first fibre in the connector body. The fact that the second fibre can be introduced into the connector body and spliced with the first fibre without requiring the unclamping of the first main clamping section 23a from the first fibre means that the orientation of the first fibre is retained.

The connector disclosed as U.S. Pat. No. 5,963,699 does not have the above advantage because the bare fibre sections of both fibres are clamped by one and the same central clamping section of that connector. The fact that there are separate clamping sections which separately clamp the coated portions of the fibres does not assist in retaining the fibre orientation, because the clamping to the coating (rather than the bare fibre) generally does not fix the orientation of a fibre against rotation.

Figure 7:
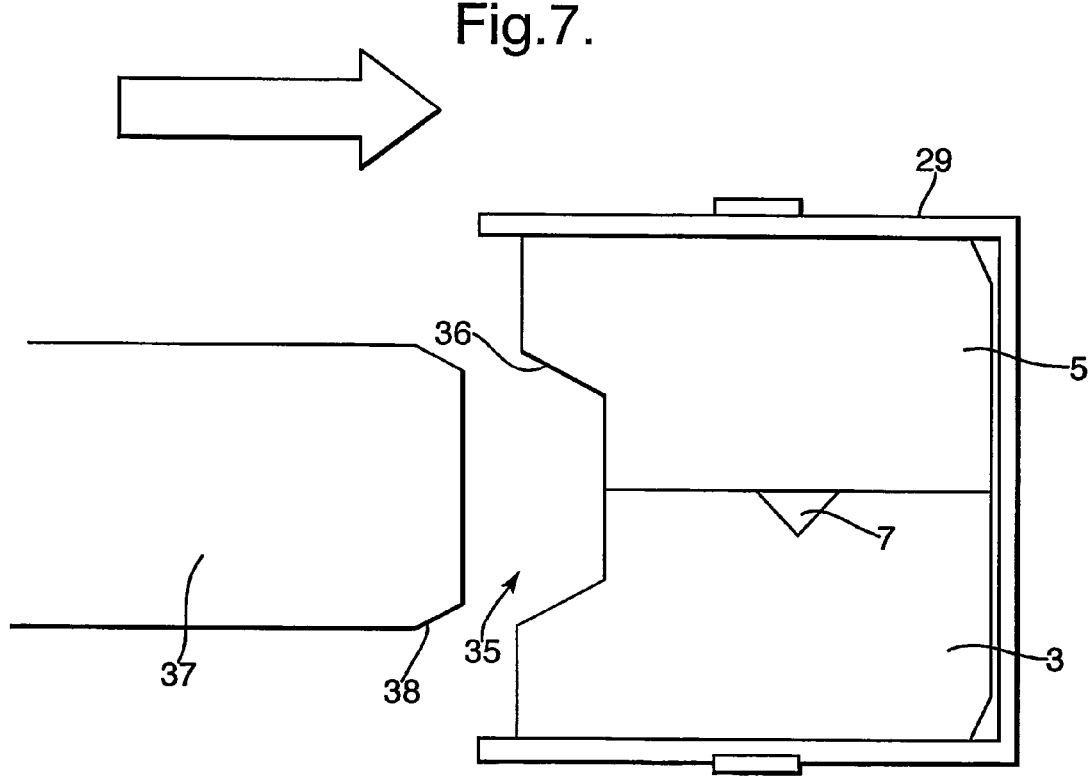
FIG. 7 is a schematic diagram illustrating a method of opening the connector of FIGS. 1 to 6, enabling the insertion or removal of optical fibres into or from the connector.

FIG. 7 is a schematic cross-sectional diagram of the assembled connector showing how the lid and base parts 3 and 5 may be separated slightly to facilitate the insertion of the optical fibres to be spliced. The lid and base parts 3 and 5 together provide a recess 35 on the open side of the resilient clamp member 29. The recess 35 has inclined side walls 36. When a specially provided wedge member 37 is inserted into the recess 35, inclined side walls 38 of the wedge member 37 co-operate with the side walls 32 of the recess to force the lid and base parts apart to be a predetermined amount. This facilitates the axial insertion of the optical fibre(s) into the channel formed by groove 7. The wedge member 37 is adapted to be able to open the lid and base parts selectively in individual clamping sections of the connector, as described above.

FIG. 8 shows a variant of the optical fibre connector shown in FIGS. 1 to 7. In this embodiment of the invention, the second regions 13 of the groove 7 are arranged to receive ferrules 39 (or other fixing members) crimped (or otherwise fixed) to respective optical fibres 9. The ferrules 39 preferably include protrusions on their exterior, which cut into the connector body in the regions 13 so as to fix the ferrules, and consequently their respective optical fibres, in a specific rotational orientation. The ferrules 39 preferably also axially retain their respective fibres within the connector, to provide resistance to axial pull and/or axial push of the fibres with respect to the connector body.

The lid and base parts of the connector body (of all embodiments of the invention) preferably are formed from polymer material, e.g. PPS. The resilient clamp member may be formed from the polymer or metal, but metal is generally preferred. Preferred metals include inox steel and beryllium copper. The ferrules preferably are formed from metal, and the plugs preferably are formed from polymer material.

Figure 9A:
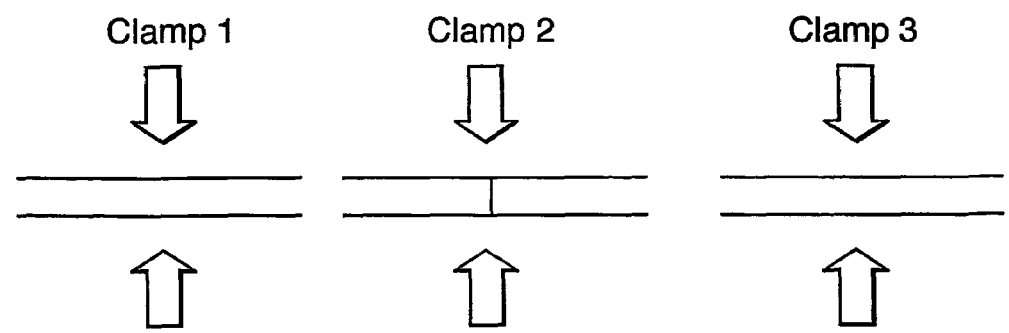
FIG. 9 is a schematic illustration showing three embodiments of alignment means of connectors according to the invention.
Figure 9B:
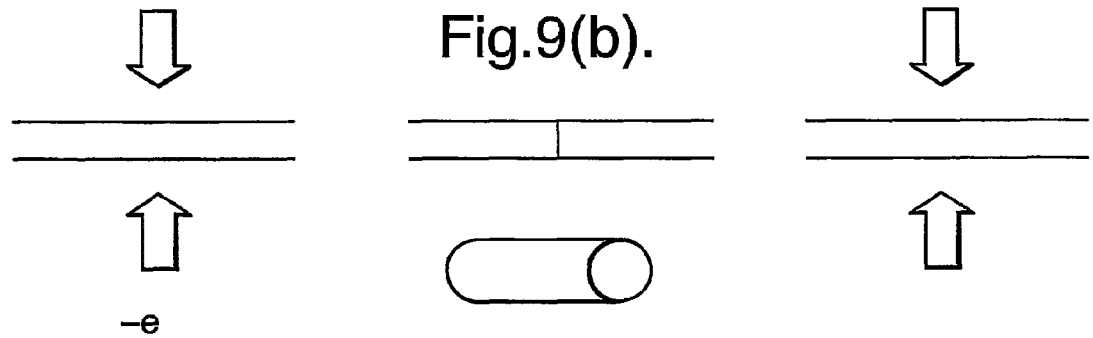
Figure 9C:
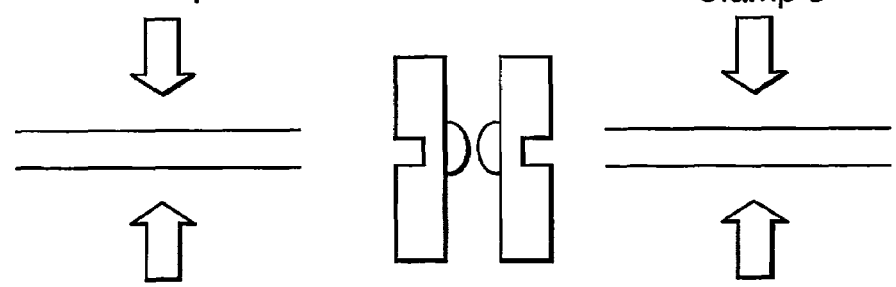

FIG. 9 is a schematic illustration showing three embodiments of alignment means of connectors according to the invention. In FIG. 9(*a*), the alignment means is a channel of the connector body, and a longitudinally central main clamping section of the connector body (labelled "Clamp 2") clamps directly onto both of the spliced bare optical fibres, thereby aligning the two fibres with each other. Two other main clamping sections, (labelled "Clamp 1" and "Clamp 3") on each side of the Clamp 2, clamp onto only their respective individual fibres, enabling independent clamping of these fibres. In each of FIGS. 9(*b*) and 9(*c*), there are only two main clamping sections, labelled Clamp 1 and Clamp 3, each of which clamps directly onto a respective one of the bare optical fibres, enabling the independent clamping of the fibres. In addition, in each of these embodiments there is an alignment member located between the two main clamping sections, arranged to align the two fibres with each other. In FIG. 9(*b*), the alignment member is a tube, in particular a glass capillary tube. In FIG. 9(*c*), the alignment member comprises a pair of plates, each of which has an aperture for receiving a respective optical fibre, and a lens (a "micro-lens") arranged to assist in the efficient coupling of light between the fibres. As mentioned earlier in this specification, the plates may be the same as, or similar to, the FIG. 13 embodiment of co-pending UK patent application number 0309908.2 filed on 30 Apr. 2003.

The invention claimed is:

1. An optical fiber connector for forming a mechanical splice between first and second bare optical fibers stripped of coatings, the connector comprising a connector body that is divided into at least two parts along at least part of a length thereof, arranged such that the optical fibers can be clamped between the parts and that comprises at least two independently openable main clamping sections dimensioned to clamp directly onto the bare fiber of the first and second optical fibers, wherein the connector body includes at least one additional independently openable clamping section dimensioned to clamp onto a coated portion of one of the optical fibers, and the clamping sections are arranged such that the first optical fiber can be clamped by a first of the main clamping sections independently of the second optical fiber, enabling the clamping of the first fiber against rotational and axial movement with respect to the connector body to remain substantially undisturbed by subsequent clamping or unclamping of the second fiber.

2. A connector according to claim 1, comprising three independently openable main clamping sections.

3. A connector according to claim 2, in which a first of the three main clamping sections is arranged to clamp onto the first fiber only, a second of the three main clamping sections is arranged to clamp onto the second fiber only, and a third of the three main clamping sections is arranged to clamp onto both of the first and second fibers.

4. A connector according to claim 1, in which one or both of the connector body parts includes a groove such that when the parts are assembled together the groove(s) form a channel extending through the body arranged to accommodate the optical fibers.

5. A connector according to claim 4, in which the main clamping sections and the channel of the connector body are configured to clamp the bare fiber of the first and second optical fibers in the channel.

6. A connector according to claim 1, comprising at least two said additional independently openable clamping sections dimensioned to clamp onto coated portions of the optical fibers.

7. A connector according to claim 1, comprising at least five clamping sections.

8. A connector according to claim 4, in which the channel has a first region, and a second region of greater diameter than the first region at each end of the first region.

9. A connector according to claim 8, in which the channel has a third region of greater diameter than the second region at the end of each second region remote from the first region.

10. A connector according to claim 9, wherein at least the second and/or third regions of the channel are substantially circular in cross-section.

11. A connector according to claim 9, in which the third regions of the channel are dimensioned to accommodate buffer coatings of the optical fibers in a tight clamping fit.

12. A connector according to claim 8, in which the first region of the channel is dimensioned to accommodate bare optical fibers stripped of coatings in a tight clamping fit.

13. A connector according to claim 9, in which the second regions of the channel are dimensioned to accommodate primary coatings of the optical fibers in a tight clamping fit.

14. A connector according to claim 1, further comprising a resilient clamp member arranged to retain the parts of the connector body together such that the optical fibers are clamped between the parts.

15. A connector according to claim 1, having at least one clamping section arranged to clamp a fixing member that is fixed to a respective optical fiber such that the fixing member is secured in the connector body when the fibers are spliced.

16. A connector according to claim 15, arranged to clamp the or each fixing member so as to retain a desired rotational orientation and axial position of its respective fiber in the connector.

17. A connector according to claim 4, further comprising at least one plug arranged to close an end of the channel when an optical fiber is not installed in that end of the channel.

18. A connector according to claim 4, in which the assembled connector body comprises a plurality of the said channels arranged to accommodate the plurality of first and second optical fibers.

19. A connector according to claim 4, including alignment means for aligning the first and second optical fibers with each other.

20. A connector according to claim 19, in which the alignment means comprises an alignment member in which the first and second optical fibers may be received and aligned.

21. A connector according to claim 20, in which the alignment member comprises a tube, or at least one plate, each tube or plate having an aperture therein for a respective one of the first and second fibers.

22. A connector according to claim 21, in which the or each tube or plate includes a lens to assist in coupling light between the first and second optical fibers.

* * * * *

UNITED STATES PATENT AND TRADEMARK OFFICE
CERTIFICATE OF CORRECTION

PATENT NO. : 7,537,398 B2 Page 1 of 1
APPLICATION NO. : 10/578152
DATED : May 26, 2009
INVENTOR(S) : Jan Watte et al.

It is certified that error appears in the above-identified patent and that said Letters Patent is hereby corrected as shown below:

Title page, item [73] Assignee's City should read "Kessel-Lo"

Signed and Sealed this

Thirty-first Day of August, 2010

David J. Kappos
*Director of the United States Patent and Trademark Office*